(12) United States Patent
Hu et al.

(10) Patent No.: US 12,148,330 B2
(45) Date of Patent: Nov. 19, 2024

(54) SPLICED LED BOX BODY

(71) Applicant: Shenzhen Time Waying Technology Co., Ltd., Guangdong (CN)

(72) Inventors: Changsheng Hu, Guangdong (CN); Shuanli Hou, Guangdong (CN)

(73) Assignee: Shenzhen Time Waying Technology Co., Ltd., Shenzhen (CN)

( * ) Notice: Subject to any disclaimer, the term of this patent is extended or adjusted under 35 U.S.C. 154(b) by 176 days.

(21) Appl. No.: 17/945,101

(22) Filed: Sep. 15, 2022

(65) Prior Publication Data
US 2023/0099426 A1    Mar. 30, 2023

Related U.S. Application Data

(63) Continuation of application No. PCT/CN2021/080014, filed on Mar. 10, 2021.

(30) Foreign Application Priority Data

Mar. 16, 2020 (CN) .......................... 202010180344.0
Mar. 16, 2020 (CN) .......................... 202010180418.0
(Continued)

(51) Int. Cl.
*G09F 9/33*        (2006.01)
*F16M 11/04*       (2006.01)
(Continued)

(52) U.S. Cl.
CPC .............. *G09F 9/33* (2013.01); *F16M 11/04* (2013.01); *F16M 13/02* (2013.01);
(Continued)

(58) Field of Classification Search
CPC ........... G09F 9/33; F16M 11/04; F16M 13/02
See application file for complete search history.

(56) References Cited

FOREIGN PATENT DOCUMENTS

| CN | 201762016 U | 3/2011 |
|---|---|---|
| CN | 206599842 U | 10/2017 |

(Continued)

OTHER PUBLICATIONS

International Search Report of PCT Patent Application No. PCT/CN2021/080014 issued on Jun. 18, 2021.

*Primary Examiner* — Joseph L Williams

(57) ABSTRACT

A spliced LED box body includes at least four LED boxes arranged in rows and columns and spliced with each other, wherein connecting components are provided on opposite adjacent splicing surfaces of the LED box. The connecting components include a first connecting component, a second connecting component, a third connecting component and a fourth connecting component. The first connecting component and third connecting component are arranged on two adjacent side surfaces of the LED box, the second connecting component is arranged on a side surface of the LED box opposite to the first connecting component, and the fourth connecting component is arranged on a side surface of the LED box opposite to the third connecting component. When two adjacent LED boxes are spliced, the first connecting component and the second connecting component are matched and connected, and the third connecting component and the fourth connecting component are matched and connected.

9 Claims, 20 Drawing Sheets

(30) Foreign Application Priority Data

| | | |
|---|---|---|
| Mar. 16, 2020 | (CN) | 202020322511.6 |
| Mar. 16, 2020 | (CN) | 202020322513.5 |
| Mar. 16, 2020 | (CN) | 202020322556.3 |
| Mar. 16, 2020 | (CN) | 202020329361.1 |
| Mar. 16, 2020 | (CN) | 202020329431.3 |
| Mar. 16, 2020 | (CN) | 202020331041.X |
| Mar. 16, 2020 | (CN) | 202020331043.9 |
| Mar. 16, 2020 | (CN) | 202030086707.5 |

(51) Int. Cl.
  *F16M 13/02* (2006.01)
  *G09F 9/302* (2006.01)
  *H02B 1/46* (2006.01)
  *H01R 9/00* (2006.01)

(52) U.S. Cl.
  CPC ............ *G09F 9/3026* (2013.01); *H02B 1/46* (2013.01); *H01R 9/00* (2013.01)

(56) References Cited

FOREIGN PATENT DOCUMENTS

| CN | 207752718 U | 8/2018 |
|---|---|---|
| CN | 208460331 U | 2/2019 |
| CN | 210039472 U | 2/2020 |
| CN | 111243445 A | 6/2020 |

SPLICED LED BOX BODY

TECHNICAL FIELD

The present invention relates to the technical field of LEDs, and in particular to a spliced LED box body.

BACKGROUND

LED display screen is a widely used visual information communication media, and its product technology and product application have been developed extensively. At present, large-sized LED display screen is generally consisted of a plurality of independent display unit boxes. When different numbers of display unit boxes are combined to form LED display screens of different areas, the display unit boxes are generally connected by bolts. However, it is difficult to ensure the splicing accuracy of the spliced LED box body when the LED boxes in the prior art are spliced.

TECHNICAL PROBLEM

The technical problem to be solved by the embodiments of the present invention is to provide a spliced LED box body, which aims to solve the problem that the splicing accuracy of the existing splicing LED box is difficult to ensure during splicing.

SUMMARY

The embodiment of the present invention is implemented as follows: a spliced LED box body includes at least four LED boxes arranged in rows and columns and spliced with each other, wherein connecting components are provided on opposite adjacent splicing surfaces of the LED box;

the connecting components include a first connecting component, a second connecting component, a third connecting component and a fourth connecting component, the first connecting component and third connecting component are arranged on two adjacent side surfaces of the LED box, the second connecting component is arranged on a side surface of the LED box opposite to the first connecting component, and the fourth connecting component is disposed on a side surface of the LED box opposite to the third connecting component; when two adjacent LED boxes are spliced, the first connecting component and second connecting component are matched and connected, and the third connecting component and fourth connecting component are matched and connected.

Further, the first connecting component includes a position limiting sliding groove and a position fixing hole, and the second connecting component includes a position limiting sliding block matching with the position limiting sliding groove and a positioning fixing pin matching with the position fixing hole, when two adjacent LED boxes are spliced, the position limiting sliding block is capable of sliding along the position limiting sliding groove to achieve the position limiting of the two adjacent LED boxes, and the positioning fixing pin is inserted into the position fixing hole to achieve the position fixing of the two adjacent LED boxes after the position limiting is completed;

the third connecting component includes a positioning pole and a limiting groove, and the fourth connecting component includes a positioning aperture matching with the positioning pole and a limiting block matching with the limiting groove, when two adjacent LED boxes are spliced, the positioning pole is inserted into the positioning aperture and the limiting block is inserted into the limiting groove.

Further, the LED box includes opposite first side surface and second side surface, and third side surface and fourth side surface interconnecting the first side surface and second side surface, the first side surface and the second side surface extend along the vertical direction, and the third side surface and the fourth side surface extend along the horizontal direction, the first connecting component is arranged on the first side surface, the second connecting component is arranged on the second side surface, the third connecting component is arranged on the third side surface, and the fourth connecting component is arranged on the fourth side surface.

Further, the splicing LED box body further includes a hoisting structure, the hoisting structure includes a hanger, the hanger is mounted on the top of the LED boxes arranged above, the hoisting structure further includes a plurality of first connecting members and a plurality of second connecting members arranged between the hanger and the LED box, two ends of the first connecting member and second connecting member are fixedly connected to the hanger and the LED box, respectively, and the first connecting members and the second connecting members are evenly distributed on a connecting surface of the hanger and the LED box.

Further, the LED box includes a frame and a door plate which is fixed to and covers a side of the frame, the hanger is formed by connecting a plurality of hanger bodies together, the first connecting member includes a connecting piece and a screw, the hanger body includes a bottom plate fixed to the top of the frame and side plates extending upwardly from two long axis sides of the bottom plate, one end of the connecting piece is clamped between the frame and the door plate, and the other end of the connecting piece is fixed to the side plate through the screw.

Further, the second connecting member is a quick installation lock, the frame includes a top border fixed to the bottom plate, the quick installation lock passes through the top border and the bottom plate in sequence to lock the top border and the bottom plate.

Further, the hoisting structure further includes a plurality of third connecting members and a plurality of connecting screw rods, the hanger is formed by connecting the hanger bodies through the third connecting members and the connecting screw rods, the hanger body further includes a top plate which is arranged on the top of the two side plates and interconnects the two side plates, two side plates of one hanger body and the side plates of an adjacent hanger body at the same side abut each other one by one, the third connecting member is arranged at a joint of two hanger bodies, and includes two opposite vertical connecting arms and a transverse connecting arm interconnecting the two vertical connecting arms, the two vertical connecting arms are arranged corresponding to the side plates at different sides, respectively, and each vertical connecting arm is attached to the two side plates which are located at the same side and abut each other, the connecting screw rods pass through the two opposite vertical connecting arms and the two opposite side plates to realize the connection of the first connecting piece and the hanger.

Further, the hoisting structure further includes a bracket arranged on the hanger body and at least two sets of adjustment components for fixing the hanger body and the bracket, the adjustment component includes a screw rod extending vertically through the top of the hanger body, the hoisting structure further includes a first nut screwed on the screw rod, the bracket is mounted around on the screw rod and placed on the hanger body, the first nut is fixedly connected to the hanger body, and the height position of the hanger body relative to the screw rod is capable of being adjusted by screwing the screw rod to adjust the top surfaces of the hanger bodies to be flush.

Further, the LED box further includes an LED module, the LED module and the door plate are arranged at opposite sides of the frame, the splicing LED box body further includes an LED module protection structure for protecting the LED box, the LED module protection structure includes a plurality of first corner protection structures arranged at corners of the LED box and covering the corners, the first corner protection structure includes a first fixed plate clamped between the frame and the door plate, two first side plates extending from two neighboring sides of the first fixed plate along a direction away from the door plate, and a first protective plate interconnecting ends of the two first side plates away from the door plate, and the first side plate extends beyond a plane wherein a surface of the LED module is located.

Further, the splicing LED box body further includes a lock structure installed on the LED box, the lock structure includes a key, a shell, a lock cylinder, a lock tongue and a microswitch unit, the shell is fixed to a side of the door plate facing the frame, the lock cylinder is installed inside the shell, the key is able to be inserted into the lock cylinder to drive the lock cylinder to rotate, the lock tongue is connected to a distal end of the lock cylinder, the microswitch unit includes a microswitch board, a microswitch and a lock retainer, the microswitch board is fixed to the frame, the microswitch is arranged on a board surface of the microswitch board, the microswitch is electrically connected to the LED module, the lock retainer is fixed onto the microswitch board and is spaced from the microswitch, when the key is turned 90° clockwise, the lock tougue is rotated to a position between the lock retainer and the microswitch and triggers the microswitch, and the LED module starts to work.

Beneficial Effects

Compared with the prior art, the present invention has the following beneficial effects: during splicing the spliced LED box body according to an embodiment of the present invention, the first connecting component and the second connecting component are matched and connected, and the third connecting component and the fourth connecting component are matched and connected, thereby ensuring the precise positioning between the boxes.

DESCRIPTION OF THE EMBODIMENTS

In order to more clearly illustrate the purpose, technical solutions and advantages of the present invention, detailed description will be given for the present invention with reference to the append drawings and embodiments. It should be understood that the specific embodiments described herein are only used to explain the present invention, not to limit the present invention.

Figure 1:
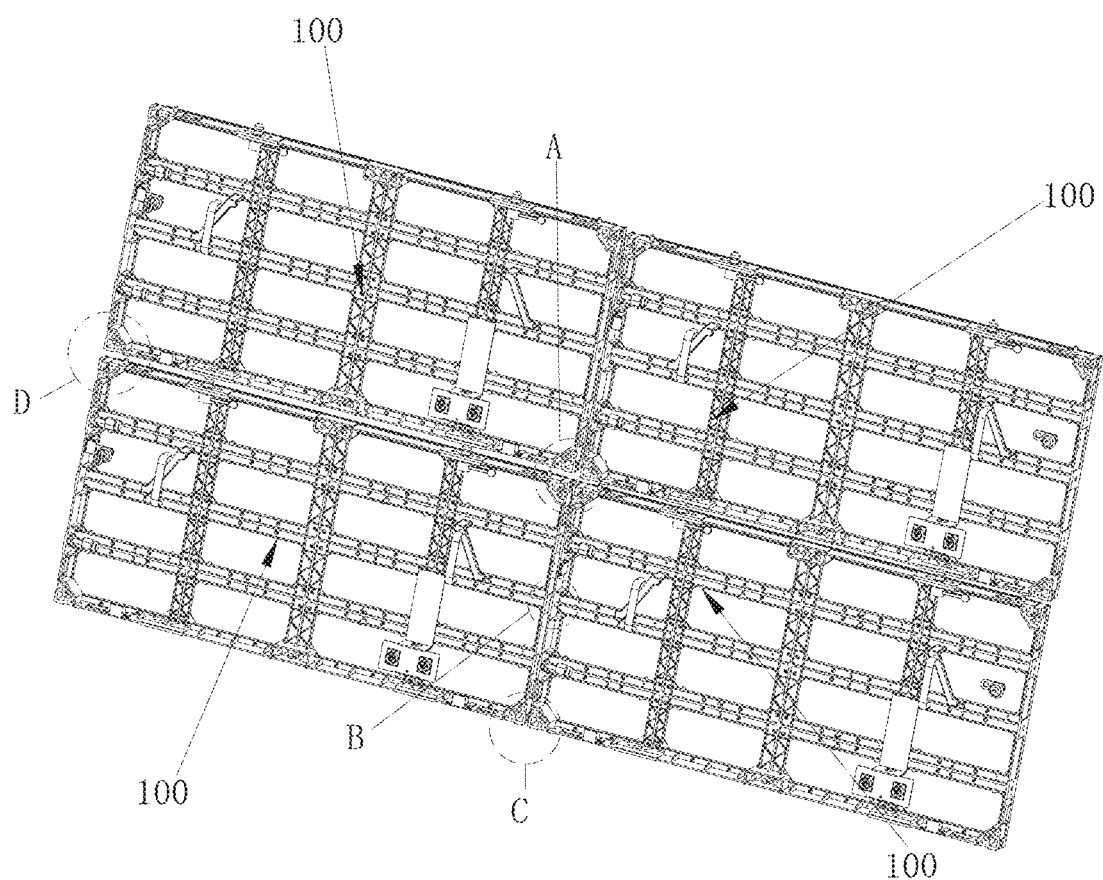
FIG. 1 is a schematic view of a spliced LED box body provided by an embodiment of the present invention.
Figure 2:
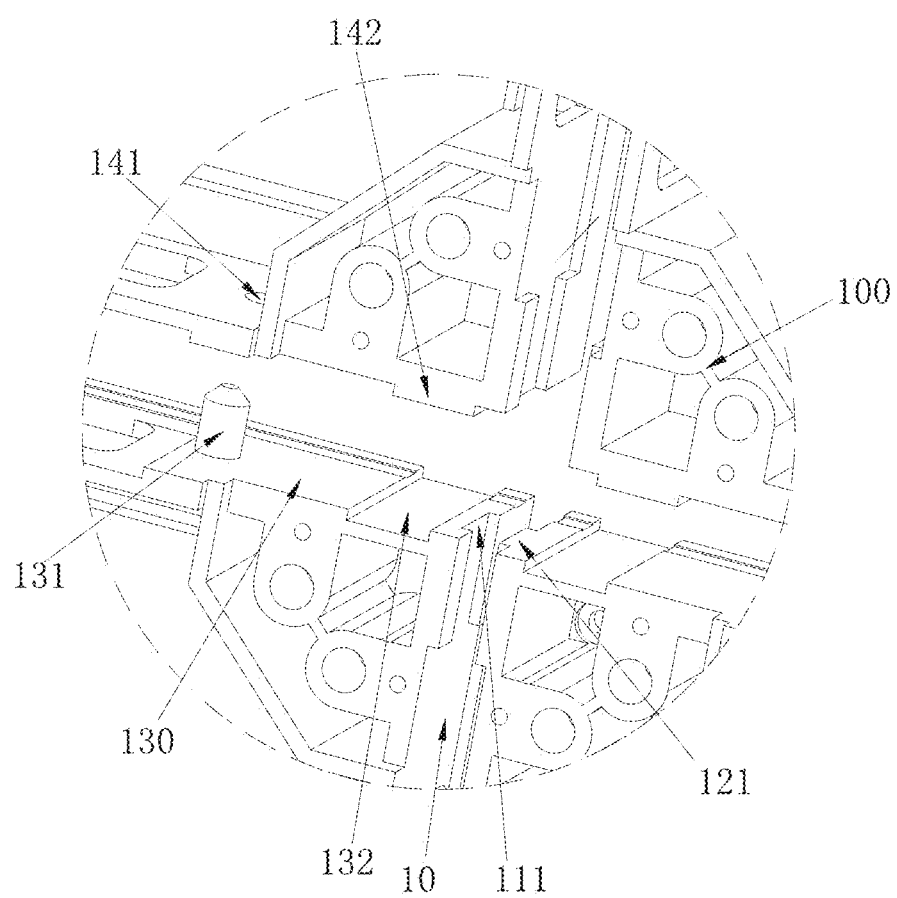
FIG. 2 is a schematic, enlarged view of a portion A of FIG. 1.
Figure 3:
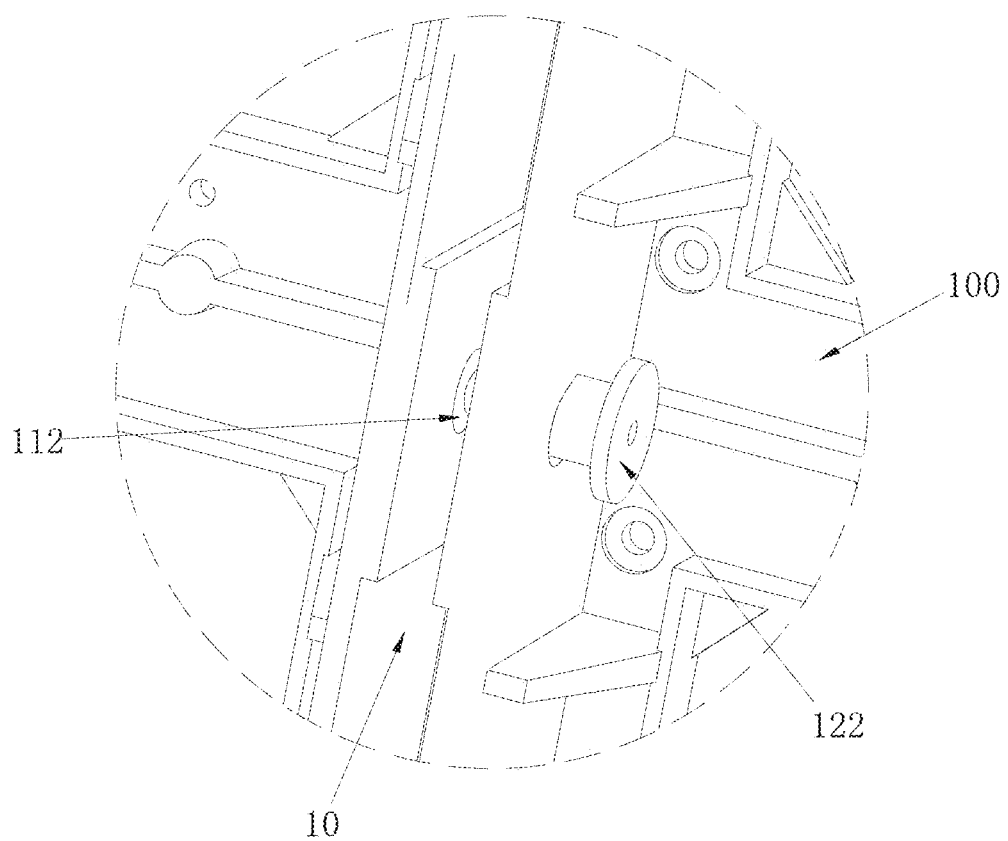
FIG. 3 is a schematic, enlarged view of a portion B of FIG. 1.

As shown in FIG. 1 to FIG. 3, which is a spliced LED box body provided by an embodiment of the present invention, including at least four LED boxes 100 arranged in rows and columns and spliced with each other. Connecting components are provided on opposite adjacent splicing surfaces of the LED box 100.

The connecting components include a first connecting component, a second connecting component, a third connecting component and a fourth connecting component. The first connecting component and third connecting component are arranged on two adjacent side surfaces of the LED box 100, the second connecting component is arranged on a side surface of the LED box 100 opposite to the first connecting component, and the fourth connecting component is arranged on a side surface of the LED box 100 opposite to the third connecting component. When two adjacent LED boxes 100 are spliced, the first connecting component and the second connecting component are matched and connected, and the third connecting component and the fourth connecting component are matched and connected. The spliced LED box body shown in this embodiment has four LED boxes 100, and there are two LED boxes 100 in each column and each row. In other embodiments, the spliced LED box body may include the LED boxes 100 with a number of 9, 16, 25, 36 and etc.

Compared with the prior art, when the spliced LED box body according to an embodiment of the present invention is spliced, the first connecting component and the second connecting component are matched and connected, and the third connecting component and the fourth connecting component are matched and connected, thereby ensuring the precise position between the boxes.

Specifically, the first connecting component includes a position limiting sliding groove 111 and a position fixing hole 112, and the second connecting component includes a position limiting sliding block 121 matching with the position limiting sliding groove 111 and a positioning fixing pin 122 matching with the position fixing hole 112. When two adjacent LED boxes 100 are spliced, the position limiting sliding block 121 may slide along the position limiting sliding groove 111 to achieve the position limiting of the two adjacent LED boxes 100, and the positioning fixing pin 122 is inserted into the position fixing hole 112 to achieve the position fixing of the adjacent two LED boxes 100 after the position limiting is completed. The precise position of the LED boxes 100 in the horizontal and vertical directions is ensured by the assembly sequence of position limiting firstly and then position fixing.

The third connecting component includes a positioning pole 131 and a limiting groove 132, and the fourth connecting component includes a positioning aperture 141 matching with the positioning pole 131 and a limiting block 142 matching with the limiting groove 132. When two adjacent LED boxes 100 are spliced, the positioning pole 131 is inserted into the positioning aperture 141 and the limiting block 142 is inserted into the limiting groove 132. By means of cooperation of the positioning pole 131 and the positioning aperture 141, position fixing of the two adjacent LED boxes 100 are realized; and then a further position fixing is obtained through the cooperation of the limiting groove 132 and the limiting block 142, thereby ensuring the precise position between the boxes 100.

It should be noted that in other specific embodiments, the first connecting component may be the position limiting sliding groove 111 and positioning fixing pin 122, and at this time the second connecting component includes the position fixing hole 112 matching with the position limiting sliding groove 111 and the position limiting sliding block 121 matching with the positioning fixing pin 122; the third connecting component may be the positioning pole 131 and limiting block 142, and at this time the fourth connecting component includes the positioning aperture 141 matching with the positioning pole 131 and the limiting groove 132 matching with the limiting block 142.

In this embodiment, the limiting groove 132 and the position limiting sliding groove 111 are square-shaped grooves. Correspondingly, the limiting block 142 and the position limiting sliding block 121 are square-shaped blocks. In other embodiments, the limiting groove 132 may be V-shaped groove, U-shaped groove, and etc., which is not limited in this embodiment.

In this embodiment, the LED box 100 includes a first side surface 10, a second side surface (not shown), and a third side surface 30 and a fourth side surface (not shown) interconnecting the first side surface 10 and the second side surface. The first side surface 10 and the second side surface extend along the vertical direction, and the third side surface 30 and the fourth side surface extend along the horizontal direction. The first connecting component is arranged on the first side surface 10, the second connecting component is arranged on the second side surface, the third connecting component is arranged on the third side surface 30, and the fourth connecting component is arranged on the fourth side surface.

Taking one of the LED boxes 100 as the benchmark, which is supposed as box A, the LED box 100 arranged at the left side of box A is box B, the LED box 100 arranged at the right side of box A is box C, the LED box 100 arranged on box A is box D, and the LED box 100 arranged under box A is box E. The box A may be connected to the second connecting component of the box B by the first connecting component, connected to the first connecting component of the box C by the second connecting component, connected to the fourth connecting component of the box D by the third connecting component, and connected to the third connecting component of the box E by the fourth connecting component. Alternatively, the box A may be connected to the first connecting component of the box B by the second connecting component, connected to the second connecting component of the box C by the first connecting component, connected to the third connecting component of the box D by the fourth connecting component, and connected to the fourth connecting component of the box E by the third connecting component. It can be understood that the first side surface 10 and the second side surface may extend along the horizontal direction, while the third side surface 30 and the fourth side surface may extend along the vertical direction. At this time, the first connecting component and the second connecting component are located at the top or bottom of the LED box 100, and the third connecting component and the fourth connecting component are located at the left side or right side of the LED box 100.

Figure 4:
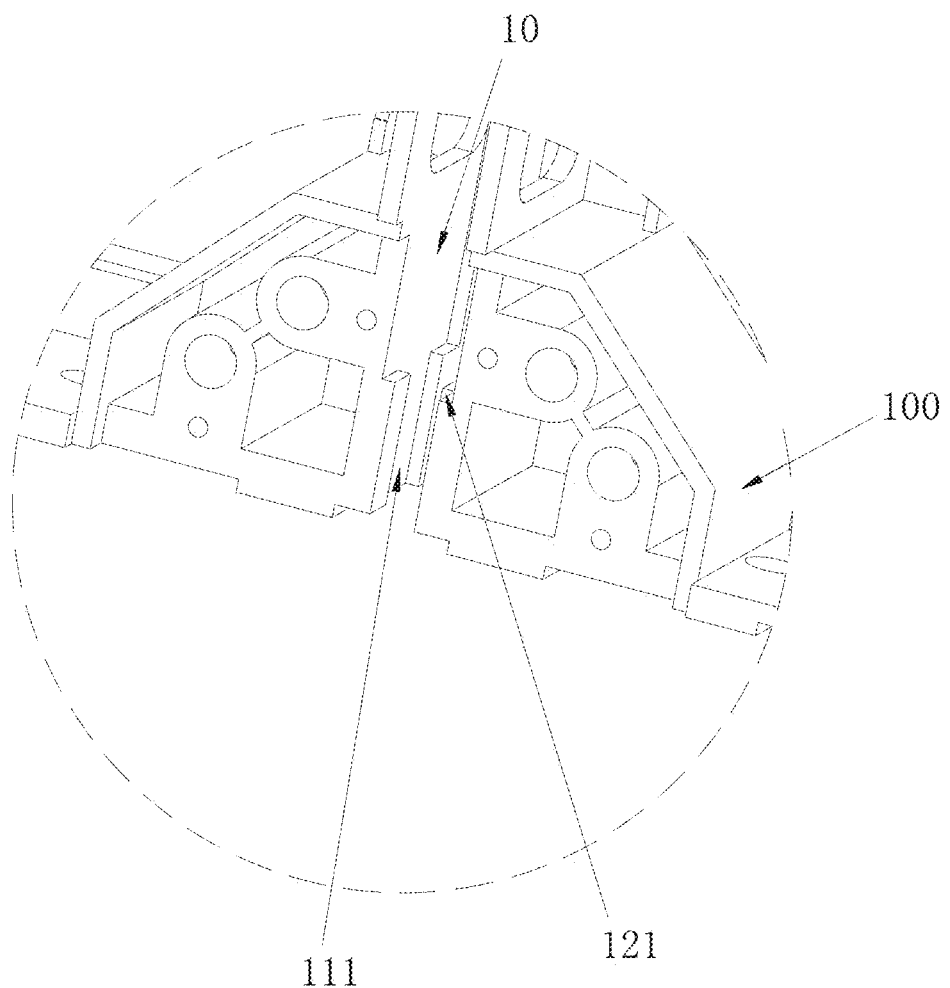
FIG. 4 is a schematic, enlarged view of a portion C of FIG. 1.
Figure 5:
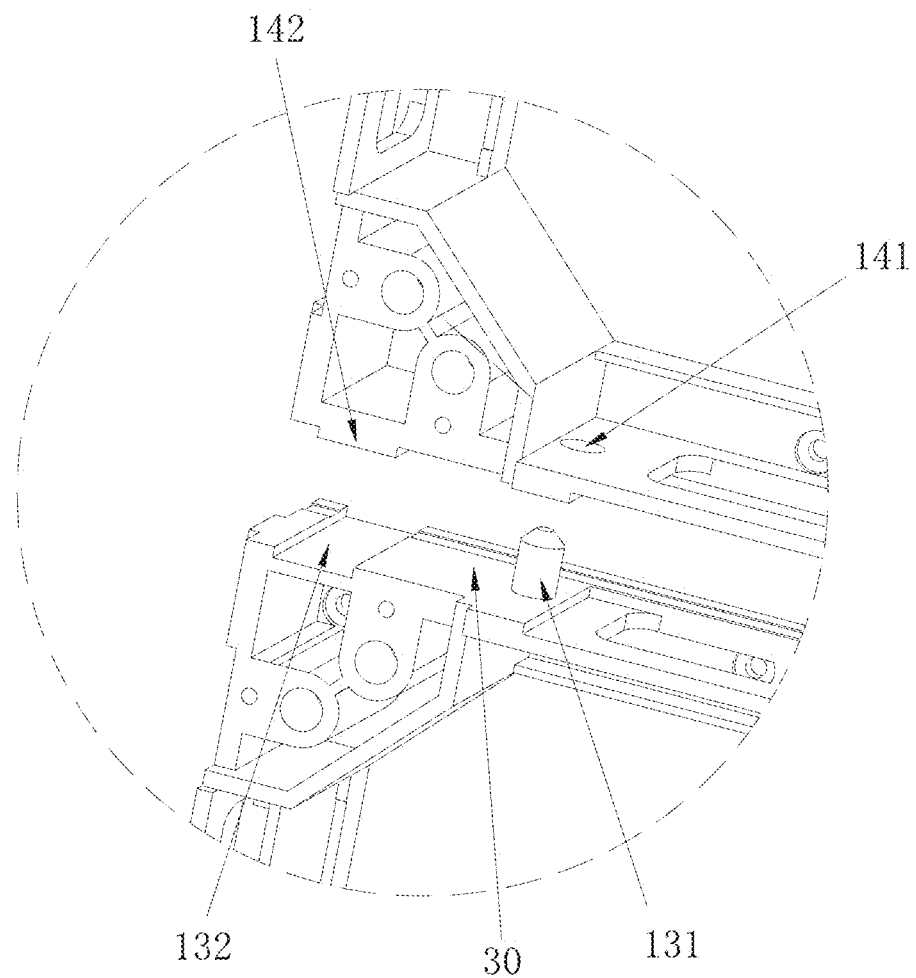
FIG. 5 is a schematic, enlarged view of a portion D of FIG. 1.

Preferably, as shown in FIG. 4 and FIG. 5, there are two positioning posts 131, and the two positioning posts 131 are arranged on two lateral sides of the third side surface 30 symmetrically. There are two position limiting sliding grooves 111, and the two position limiting sliding grooves 111 are arranged at top and bottom edges of the first side surface 10, respectively; and there are two position limiting sliding blocks 121, and the two position limiting sliding blocks 132 are arranged at top and bottom edges of the second side surface 10, respectively. There are two limiting grooves 132 too, and the two limiting grooves 132 are arranged at two end edges of the third side surface 30, respectively; there are two limiting blocks 142, the two limiting blocks 142 are arranged at two end edges of the fourth side surface, respectively. By means of position limiting at two ends simultaneously, two adjacent LED boxes 100 are aligned more accurately. In addition, the position fixing hole 112 is defined at a middle portion of the first side surface 10, and the positioning fixing pin 122 is arranged at a middle portion of the second side surface.

In other specific embodiments, the first side surface 10 may be configured to form the position limiting sliding groove 111 at the top edge thereof and form the position limiting sliding block 121 at the bottom edge thereof; the second side surface is configured to form the position limiting sliding block 121 at the top edge thereof and form the position limiting sliding groove 111 at the bottom edge thereof. Similarly, the third side surface 30 may be configured to form the limiting groove 132 at the left edge thereof and form the limiting block 142 at the right edge thereof; the fourth side surface is configured to form the limiting block 142 at the left edge thereof and form the limiting groove 132 at the right edge thereof. The third side surface 30 may be configured to form the positioning pole 131 at the left edge thereof and form the positioning aperture 141 at the right edge thereof; the fourth side surface is configured to form the positioning aperture 141 at the left edge thereof and form the positioning pole 131 at the right edge thereof.

Figure 6:
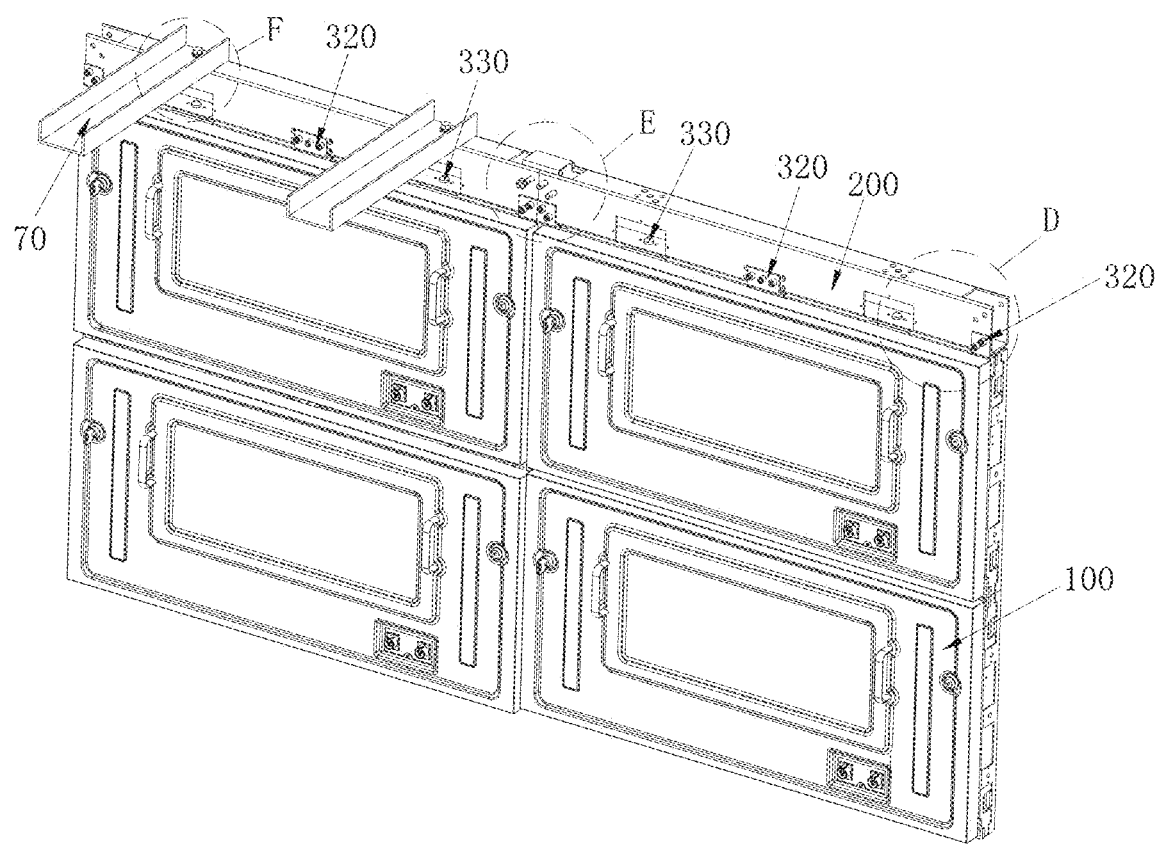
FIG. 6 is a schematic view of an LED box and a hoisting structure provided by an embodiment of the present invention.
Figure 7:
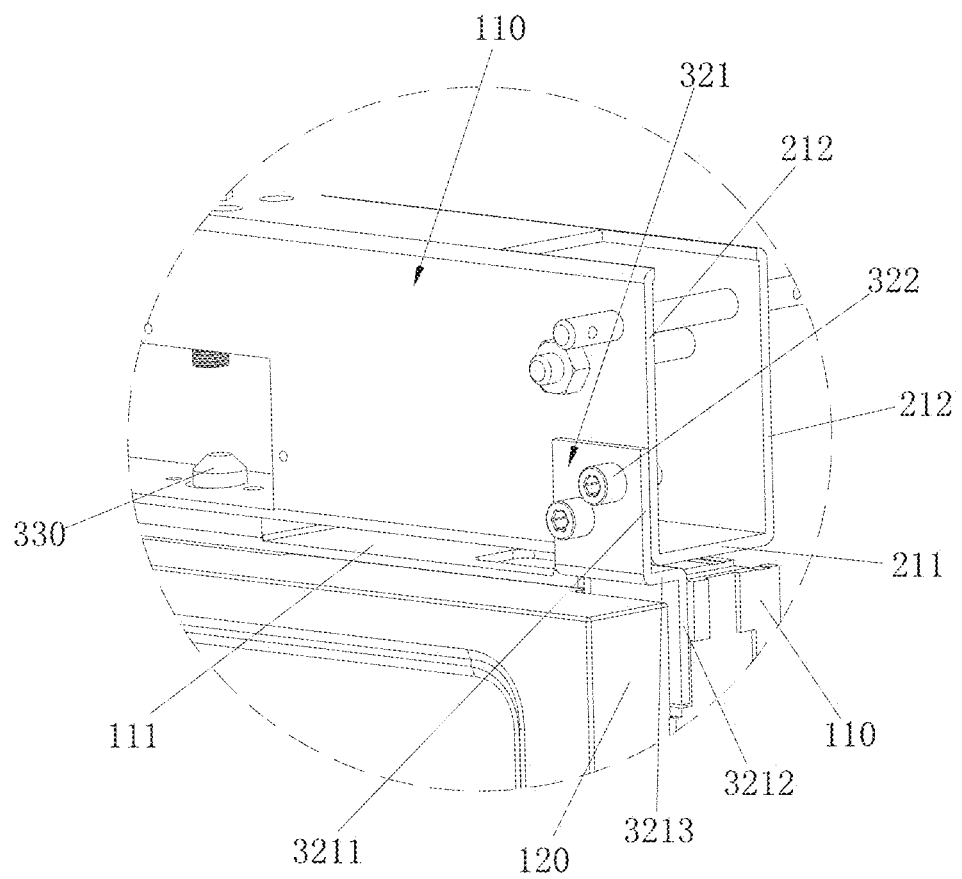
FIG. 7 is a schematic, enlarged view of a portion E of FIG. 6.

As shown in FIG. 6 and FIG. 7, in this embodiment, the splicing LED box body further includes a hoisting structure. The hoisting structure includes a hanger 200, and the hanger 200 is mounted on the top of the LED box 100 arranged above.

The hoisting structure further includes a plurality of first connecting members 320 and a plurality of second connecting members 330 arranged between the hanger 200 and the LED box 100. Two ends of the first connecting member 320 and second connecting member 330 are fixedly connected to the hanger 200 and the LED box 100, respectively. The first connecting members 320 and the second connecting members 330 are evenly distributed on a connecting surface of the hanger 200 and the LED box 100. Since the first connecting members 320 and the second connecting members 330 are evenly distributed on the connection surface of the hanger 200 and the LED box 100, the stress points on the LED box 100 are evenly distributed during hoisting the spliced LED box body, i.e., there is no stress concentration point, which makes the spliced LED box body stress evenly, thereby ensuring a stable lifting state.

Specifically, the LED box 100 includes a frame 110 and a door plate 120 which is fixed to and covers one side of the frame 110. The hanger 200 is formed by connecting a plurality of hanger bodies 210 together. The first connecting member 320 includes a connecting piece 321 and a screw 322. The hanger body 210 includes a bottom plate 211 which is fixed to the top of the frame 110 and side plates 212 which extend upwardly from two long axis sides of the bottom plate 211. One end of the connecting piece 321 is clamped between the frame 110 and the door plate 120, and the other end of the connecting piece 321 is fixed to the side plate 212 by the screw 322.

The connecting piece 321 includes a first fixing portion 3211, a second fixing portion 3212 and a connecting portion 3213 interconnecting the first fixing portion 3211 and the second fixing portion 3212. The first fixing portion 3211 and the second fixing portion 3212 are parallel to each other, and the connecting portion 3213 is perpendicular to the first fixing portion 3211 and the second fixing portion 3212. The first fixing portion 3211 is fixed onto the side plate 212, the second fixing portion 3212 is clamped between the frame 110 and the door plate 120, and the connecting portion 3213 is attached to a bottom surface of the bottom plate 211. Such special structure of the connecting piece 321 makes the connection between the LED box 100 and the hanger 200 more firm.

In addition, the second connecting member 330 of this embodiment is a quick installation lock. The frame 110 includes a top border 111 fixed to the bottom plate 211. The quick installation lock passes through the top border 111 and the bottom plate 211 in sequence to lock the top frame 111 and the bottom plate 211. The setting of the second connecting members 330 increases the number of connection points of the LED box 100 and the hanger 200, which not only further enhances the firmness of the connection of the LED box 100 and the hanger 200, but also increases the stress points of the LED box 100 during the hoisting process of the spliced LED box body, making the spliced LED box body stress evenly during the hoisting process.

Specifically, the spliced LED box body of this embodiment is formed by splicing four LED boxes 100 in rows and columns, and the hanger 200 is mounted on two LED boxes 100 which are arranged in the upper row. The first connecting members 320 are five in number, and are arranged at the left edge of the top of the left LED box 100, at the center of the top of the left LED box 100, at a connecting position of the two LED boxes 100, at the center of the top of the right LED box 100, and the right edge of the top of the right LED box 100, respectively. The second connecting members 330 are four in number, and each are arranged between two adjacent first connecting members 320. In other possible embodiments, the positions of the second connecting members 330 and the first connecting members 320 may be interchanged: the second connecting members 330 are five in number, while the first connecting members 320 are four in number and each are arranged between two adjacent second connecting members 330. The numbers of the first connecting members 320 and the second connecting members 330 may be increased, such as setting seven first connecting members 320 and six second connecting members 330, and etc. The numbers of the first connecting members 320 and the second connecting members 330 are not limited in this embodiment, as long as the first connecting members 320 and the second connecting members 330 are evenly distributed.

Figure 8:
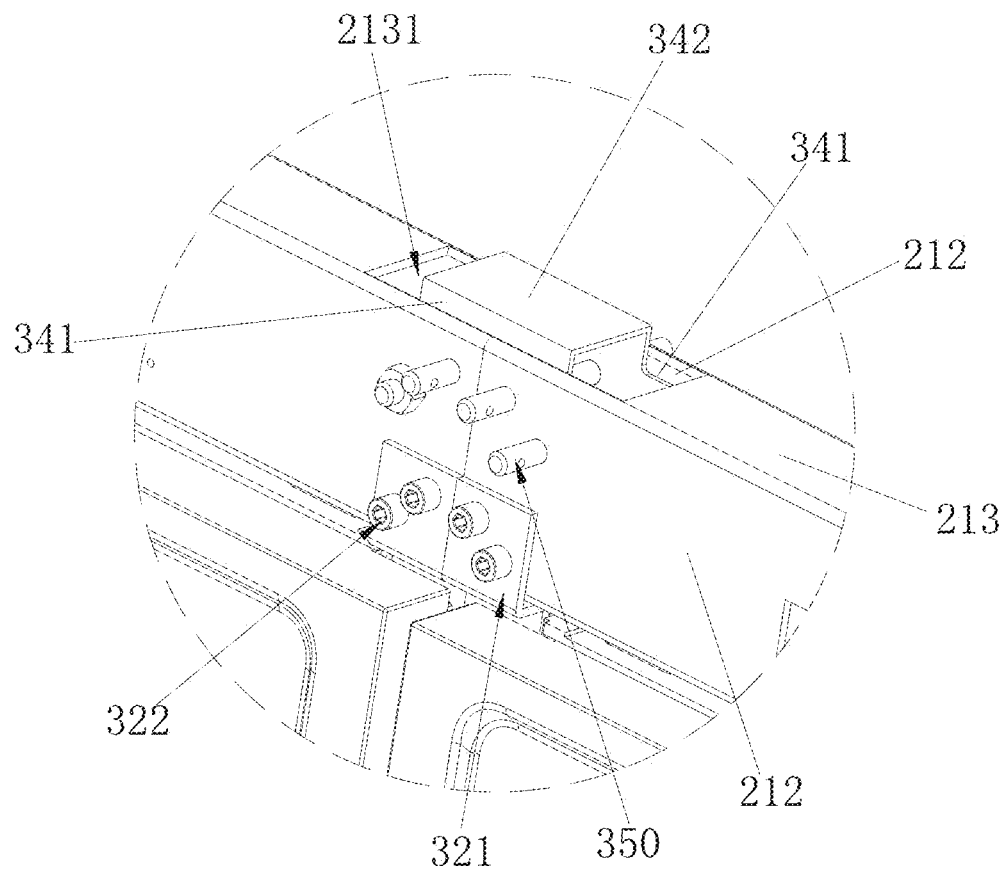
FIG. 8 is a schematic, enlarged view of a portion F of FIG. 6.
Figure 9:
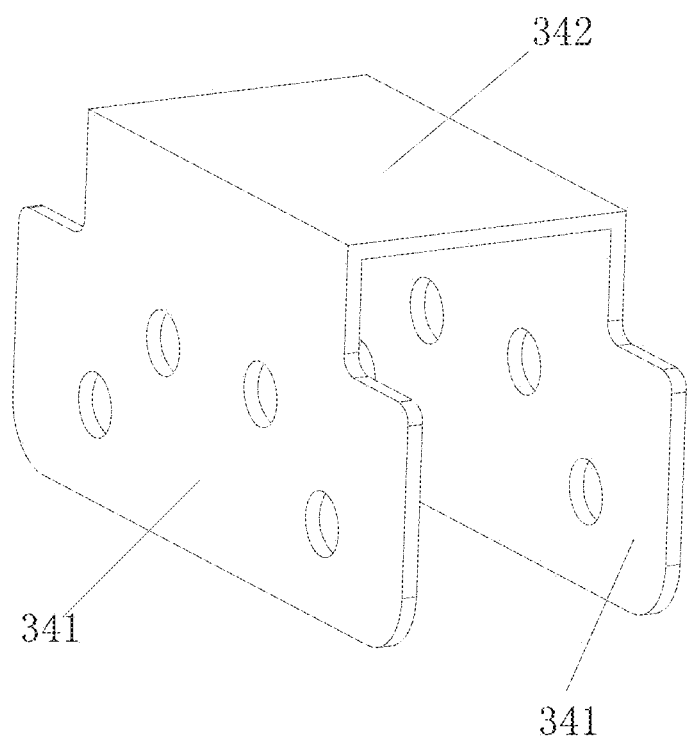
FIG. 9 is a schematic view of a third connecting member of FIG. 6.

Please further referring to FIG. 8 and FIG. 9, the hoisting structure of the LED box body further includes a plurality of third connecting members 340 and a plurality of connecting screw rods 350. The hanger 200 is formed by connecting the hanger bodies 210 through the third connecting members 340 and the connecting screw rods 350. The hanger body 210 further includes a top plate 213 arranged on the top of the two side plates 212 and interconnecting the two side plates 212. The two side plates 212 of one hanger body 210 and the side plates 212 of an adjacent hanger body 210 at the same side respectively abut each other one by one. The third connecting member 340 is arranged at a joint of two hanger bodies 210. The third connecting member 340 includes two opposite vertical connecting arms 341 and a transverse connecting arm 342 interconnecting the two vertical connecting arms 341. The two vertical connecting arms 341 are arranged corresponding to the side plates 212 at different sides, respectively, and each vertical connecting arm 341 is attached to the two side plates 212 which are located at the same side and abut each other. The connecting screws 350 pass through the two opposite vertical connecting arms 341 and the two opposite side plates 212 to realize the connection of the third connecting member 340 and the hanger 200. Through holes may be defined in the vertical connecting arms 341 and the side plates 212, and one connecting screw rod 350 passes through the side plate 212 at one side, the vertical connecting arm 341 attached to the side plate 212, another vertical connecting arm 341 corresponding to the vertical connecting arm 341 and the side plate 212 on the other side in sequence, so as to connect the third connecting member 340 to the side plates 212 at two sides of the hanger body 210 closely. Two adjacent hanger bodies 210 are connected tightly by the third connecting member 340, which is easy to implement, small and light, and has strong practicability.

In addition, as shown in FIG. 8, two top plates 213 of two adjacent hanger bodies 210 are set at intervals, and a gap 2131 is defined at the joint of the two hanger bodies 210. The third connecting member 340 is arranged at the gap 2131, so as to facilitate the adjustment of a position of the third connecting member 340, making the third connecting member 340 and the hanger body 210 be connected more firmly.

In one possible embodiment, the third connecting member 340 is located between two opposite side plates 212, and an outer face of the vertical connecting arm 341 is attached to inner faces of two side plates 212 which are located at the same side and abut each other. In another possible embodiment, a distance between the two vertical connecting arms 341 of the third connecting member 340 is greater than a distance between the two opposite side plates 212, and an inner face of the vertical connecting arm 341 is attached to outer faces of the two side plates 212 which are located at the same side and abut each other.

Preferably, the number of the connecting screws 350 is four, and the connecting screws 350 are arranged in two rows. Each row is provided with two connecting screws 350. A distance between the two connecting screws 350 arranged in the upper row is less than that between the two connecting screws 350 arranged in the lower row, so that the vertical connecting arm 341 can be attached to the side plates 212 more closely. In other specific embodiments, the number of connecting screws 350 may be five, six, seven, eight, and etc, the connecting screws 350 may be arranged in three rows, four rows, five rows, and etc. The number and the arrangement of the connecting screws 350 are not limited in this embodiment. Optionally, the diameter of the connecting screw rod 350 is 10 mm In addition, please referring to FIG. 6, FIG. 10 and FIG. 11, the hoisting structure of the LED box body of this embodiment further includes a bracket 370 arranged on the hanger body 210 and at least two sets of adjustment components for fixing the hanger body 210 and the bracket 370. The adjustment component includes a screw rod 360 which extends vertically through the top of the hanger body 210. The hoisting structure of the LED box body further includes a first nut 390 screwed on the screw rod 360. The bracket 370 is mounted around the screw rod 360 and placed on the hanger body 210. The first nut 390 is fixedly connected to the hanger body 210. The height position of the hanger body 210 relative to the screw rod 360 can be adjusted by screwing the screw rod 360, so that top surfaces of the hanger bodies 210 can be adjusted to be flush. Such structure is easy to implement and has strong practicability.

Figure 10:
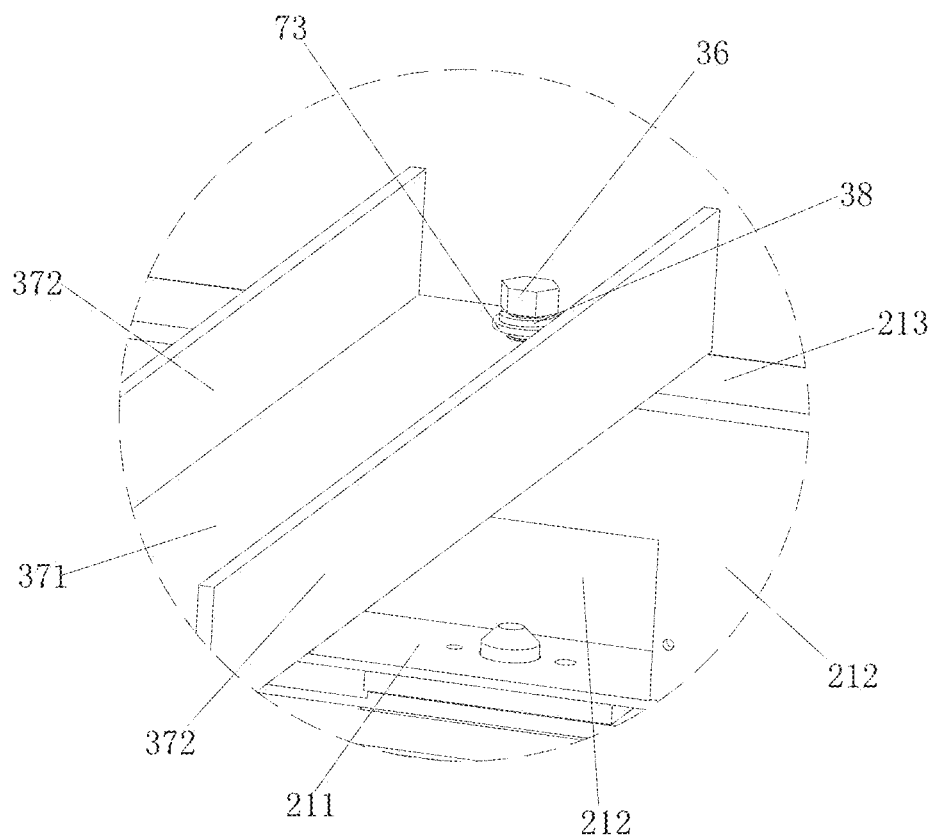
FIG. 10 is a schematic, enlarged view of a portion G of FIG. 6.
Figure 11:
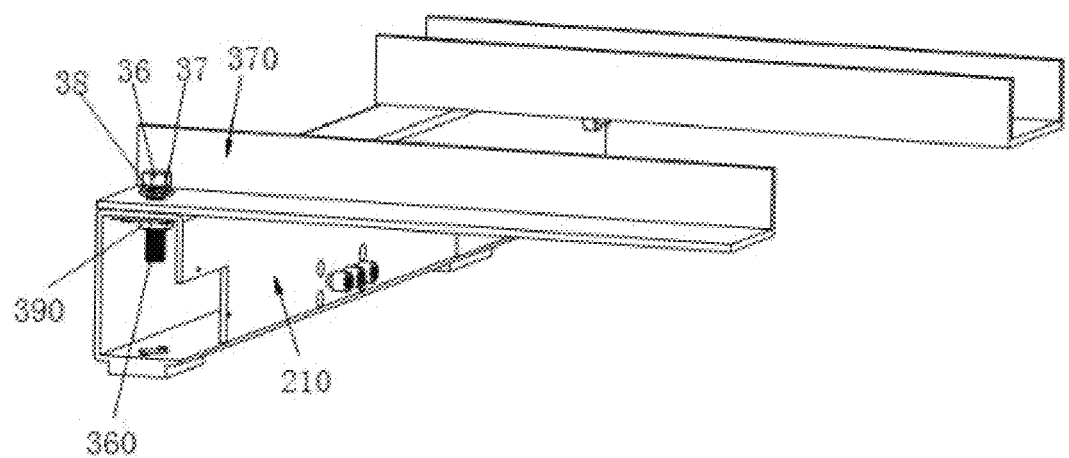
FIG. 11 is a partial, cross-sectional view of FIG. 6 viewed from another aspect.

In some embodiments, the adjusting component further includes a bolt, which can be screwed to drive the screw rod 360 to rotate, so as to adjust the height position of the hanger unit 210 relative to the screw rod 360 to adjust the top surfaces of the hanger bodies 210 to be flush. In a specific embodiment, as shown in FIG. 10 and FIG. 11, the adjusting component is a hexagon bolt. A gasket 37 and a spring washer 38 are sandwiched between a head 36 of the hexagon bolt and the top of the bracket 370, wherein the gasket 37 can protect the contact surfaces of the top of the bracket 370 and the hexagon bolt, and the spring washer 38 provides pre-tightening force for the bolt.

The length of the screw rod 360 below the top plate 213 should be long enough to allow enough adjustment space for the first nut 390, but it should not be too long to contact the bottom plate 211. In this embodiment, the first nut 390 is fixed to a bottom surface of the top plate 213, and the bracket 370 abuts a top surface of the top plate 213. Preferably, the first nut 390 is connected to the top plate 213 by welding, which makes the connection of the first nut 390 and the top plate 213 more closely.

As shown in FIG. 10 and FIG. 11, in one possible embodiment, the bracket 370 includes a bottom arm 371 extending along a direction perpendicular to a plate surface of the side plate 212 and side arms 372 extending upwardly from two long axis edges of the bottom arm 371. The bottom arm 371 is mounted around the screw rod 360 and placed on the hanger body 210. The bottom arm 371 abuts the top surface of the top plate 213. The number of brackets 370 is two, and the number of screw rods 360 is two. The two screw rods 360 are symmetrically arranged on the top of the hanger body 210. The number of screw rods 360 may be three, four, five, six, and etc., which is not limited in this embodiment.

Figure 12:
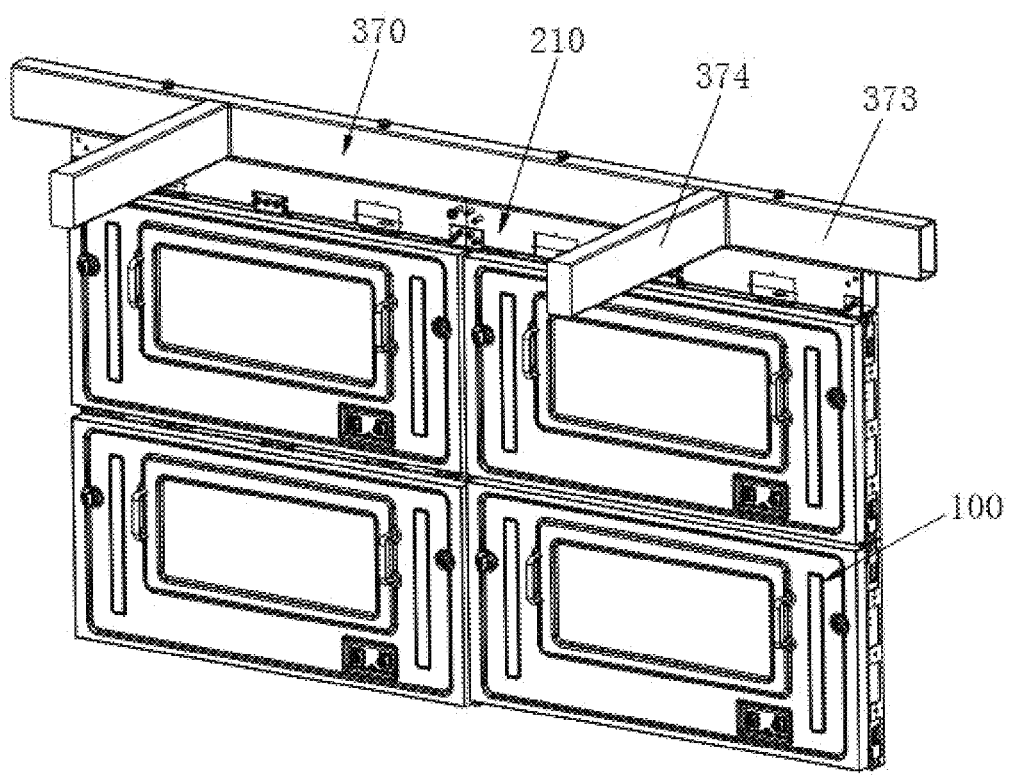
FIG. 12 is a schematic view of the LED box and the hoisting structure provided by another embodiment of the present invention.
Figure 13:
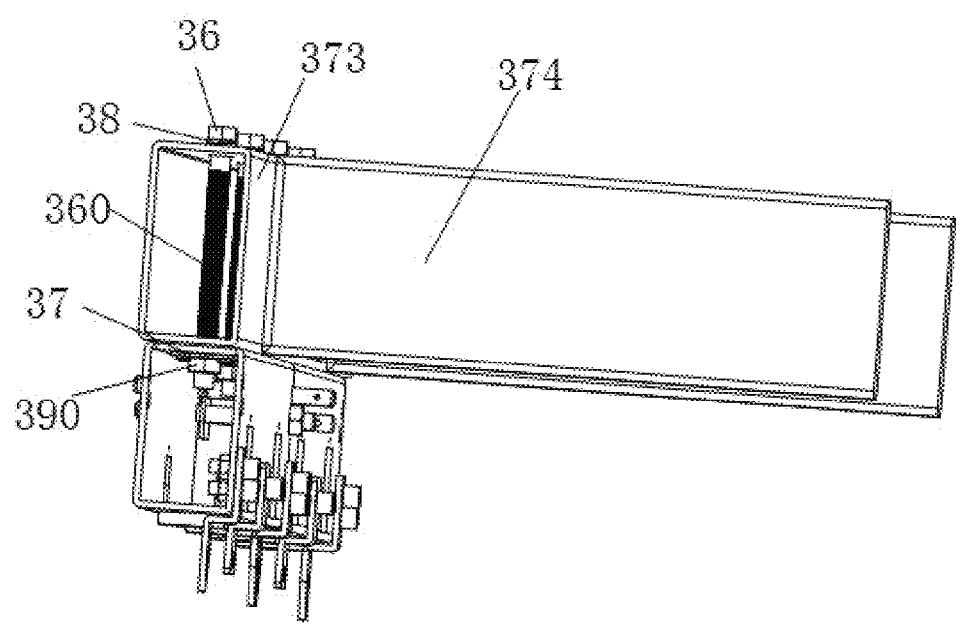
FIG. 13 is a schematic view of the hoisting structure of FIG. 12.

As shown in FIG. 12 and FIG. 13, in another possible embodiment, the bracket 370 includes a crossbeam 373 fixed on the hanger body 210 and a boundary beam 374 extending from one side of the crossbeam 373 along a direction perpendicular to the crossbeam 373. There are two boundary beams 374 and the two boundary beams 374 are symmetrically arranged. The crossbeam 373 is a hollow structure, and the screw rod 360 passes through the hollow area inside the crossbeam 373. The adjusting component is a hexagon bolt. A gasket 37 and a spring washer 38 are sandwiched between a head 36 of the hexagon bolt and the top of the crossbeam 373. A gasket 37 is also arranged between the first nut 390 and the top plate 213. By means of adopting the bracket 370 of such structure, a stress area between the bracket 370 and the hanger body 210 is enlarged and a stress force is reliable, thereby improving the stability of the hanger body 210 and the safety of hoisting.

Preferably, the bracket 370 is a steel structure bracket 370, which has the advantages of high strength, light deadweight, good overall stiffness, and strong resistance to deformation.

Figure 14:
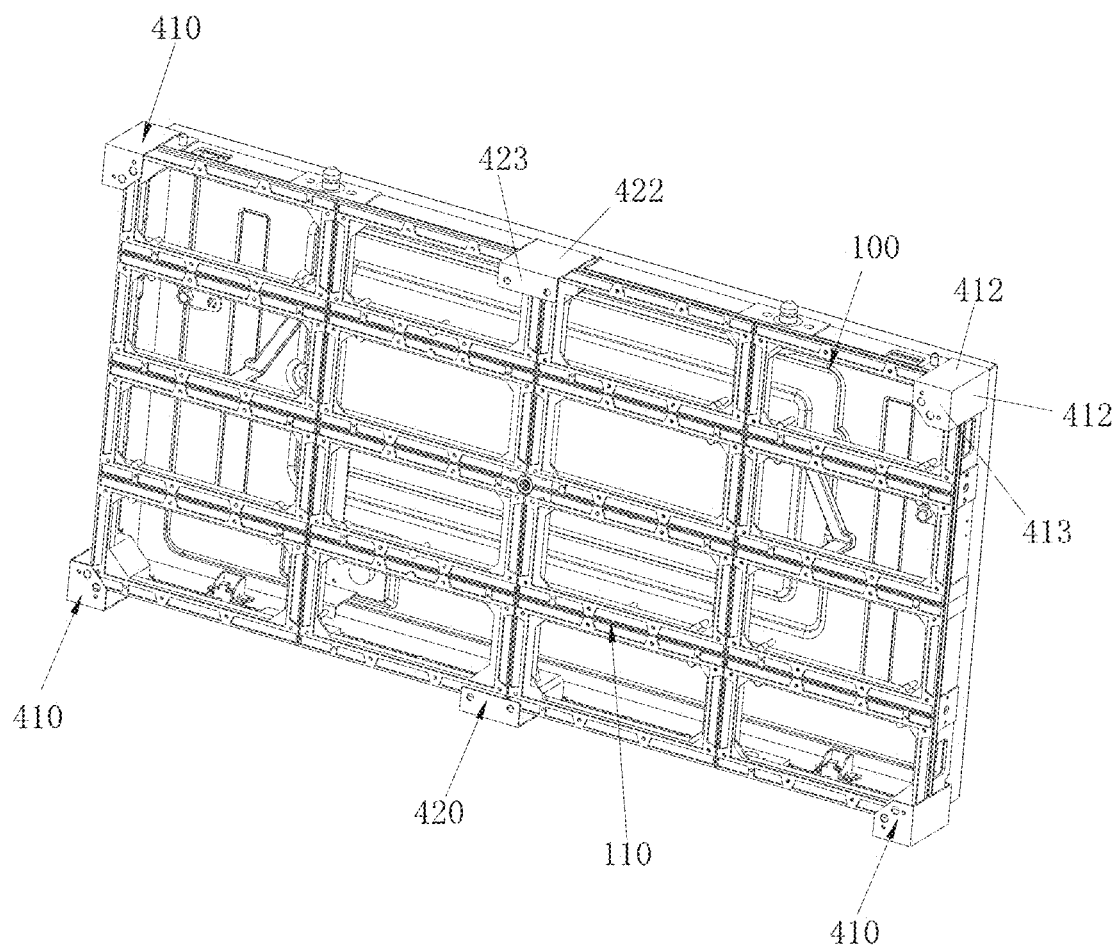
FIG. 14 is a schematic view of an LED box and an LED module protection structure provided by an embodiment of the present invention.
Figure 15:
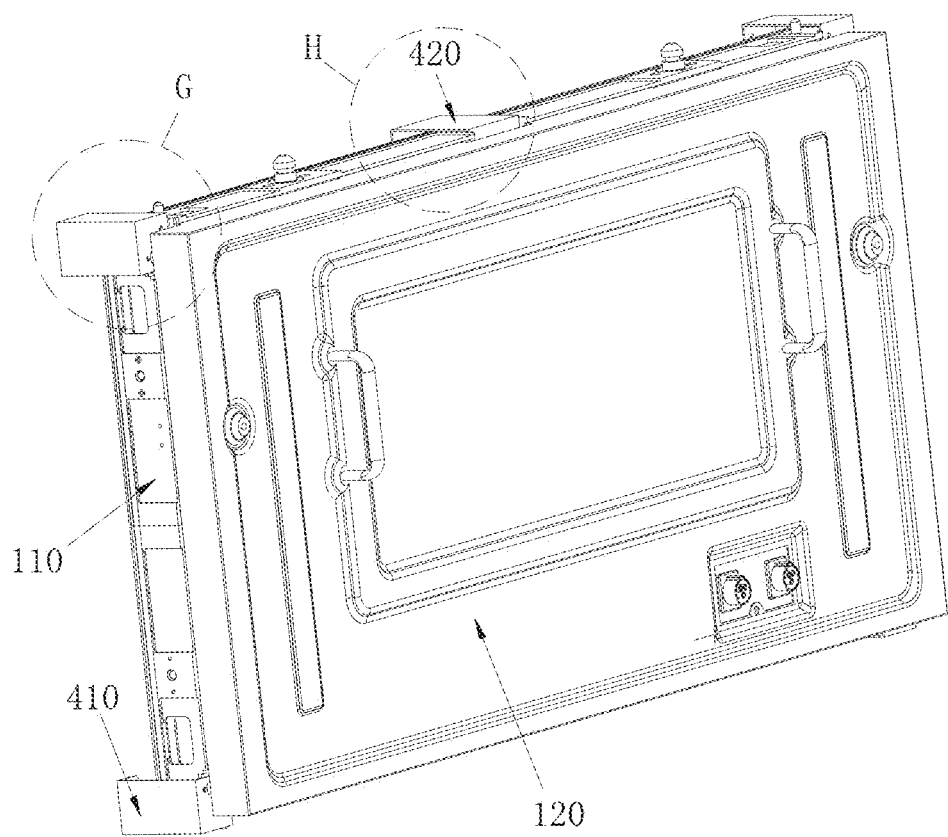
FIG. 15 is schematic view of FIG. 14 viewed from another aspect.

In addition, the LED box 100 further includes an LED module. The LED module and the door plate 120 are arranged at two opposite sides of the frame 110. As shown in FIG. 14 and FIG. 15, the spliced LED box body further includes an LED module protection structure which is configured for protecting the LED box 100. The LED module protection structure includes a plurality of first corner protection structures 410, which are arranged at corners of the LED box 100 and cover the corners.

Figure 16:
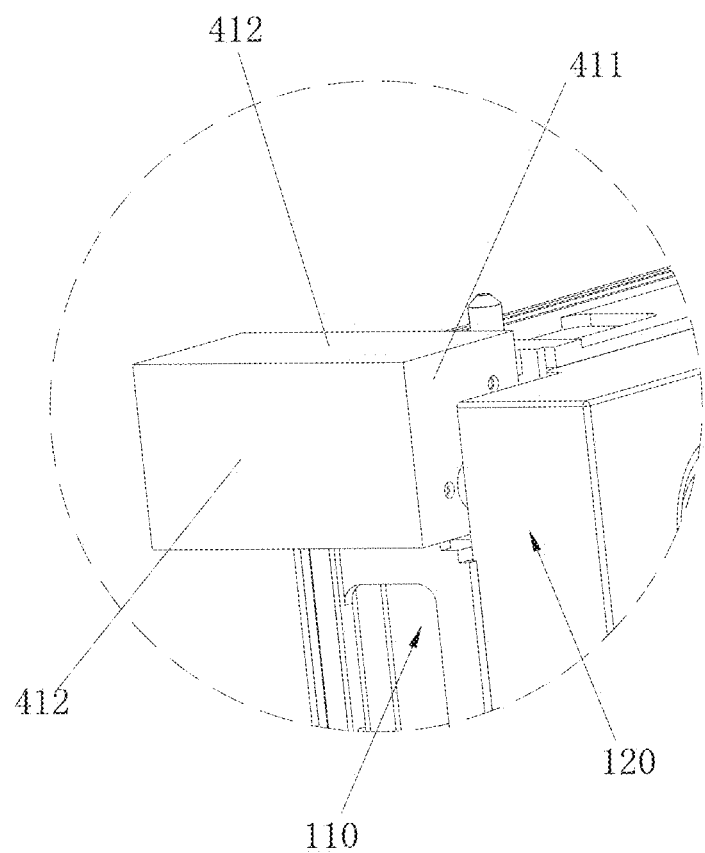
FIG. 16 is a schematic, enlarged view of a portion G of FIG. 15.

Specifically, referring to FIG. 16, the first corner protection structure 410 includes a first fixed plate 411 which is clamped between the frame 110 and the door plate 120, two first side plates 412 extending from two neighboring sides of the first fixed plate 411 along a direction away from the door plate 120, and a first protective plate 413 which interconnects ends of the two first side plates 412 away from the door plate 120. The first side plate 412 extends beyond a plane wherein a surface of the LED module is located. Since three sides of the LED bead at the corner of the LED box 100 are totally exposed to the outside, it is easy to be impacted or rubbed by external forces when the LED box 100 is transported or placed. The two first side plates 412 and the first protective plate 413 can effectively cover these three sides, so as to ensure effective barrier protection for the LED bead and prevent the LED bead from being damaged when the LED box 100 is placed and transported. Preferably, the first corner protection structures 410 are four in number, and correspondingly are mounted at four corners of the LED box 100.

Figure 17:
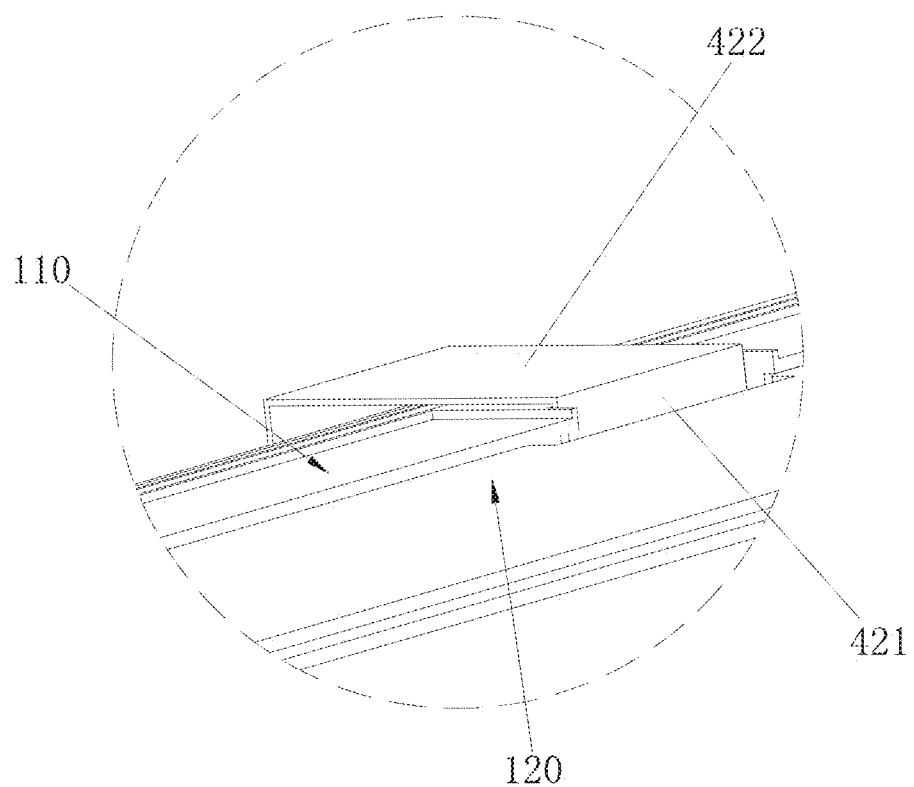
FIG. 17 is a schematic, enlarged view of a portion H of FIG. 15.

In this embodiment, the LED module protective structure further includes a plurality of second corner protection structures 420 which are arranged at lateral edges of the LED box 100 and covers the lateral edges. Referring to FIG. 14 and FIG. 17, the second corner protection structure 420 includes a second fixed plate 421 clamped between the frame 110 and the door plate 120, a second side plate 422 extending from an edge of the second fixed plate 210 which corresponds to the long axis edge of the LED box 100 along a direction away from the door plate 120, and a second protective plate 423 extending from an end of the second side plate 422 away from the door plate 120 along a direction parallel to the plane where the surface of the LED module is located. The second side plate 422 extends beyond the plane where the surface of the LED module is located.

Since two sides of the LED bead located at the lateral edges of the LED box 100 are totally exposed to the outside, it is easy to be impacted or rubbed by external forces when the LED box 100 is transported or placed. The second side plate 422 and the second protective plate 423 can effectively cover these two sides, thus ensuring effective barrier protection for the LED bead.

Preferably, the second corner protection structures 420 are two in number, and the two second corner protection structures 420 are respectively arranged at two opposite long axis edges of the LED box 100. In other possible embodiments, the second corner protection structures 420 may be arranged at two opposite short axis edges of the LED box 100 too. The two opposite long axis edges and two opposite short axis edges of the LED box 100 may be provided with several second corner protection structures 420, and the number of the second corner protection structures 420 is not limited in this embodiment.

Preferably, the first corner protection structures 410 and the second corner protection structures 420 are made of low-carbon cold-rolled steel plate materials, aluminum alloy materials or engineering plastic materials. The corner protection structures made of low-carbon cold-rolled steel plate materials, aluminum alloy materials or engineering plastic materials have high hardness, good strength, and long service life, which can enhance the protection for the LED beads. Of course, in other embodiments, the first corner protection structures 410 and the second corner protection structures 420 can also be made of other materials with high hardness and strength, which is not limited in this embodiment.

Figure 18:
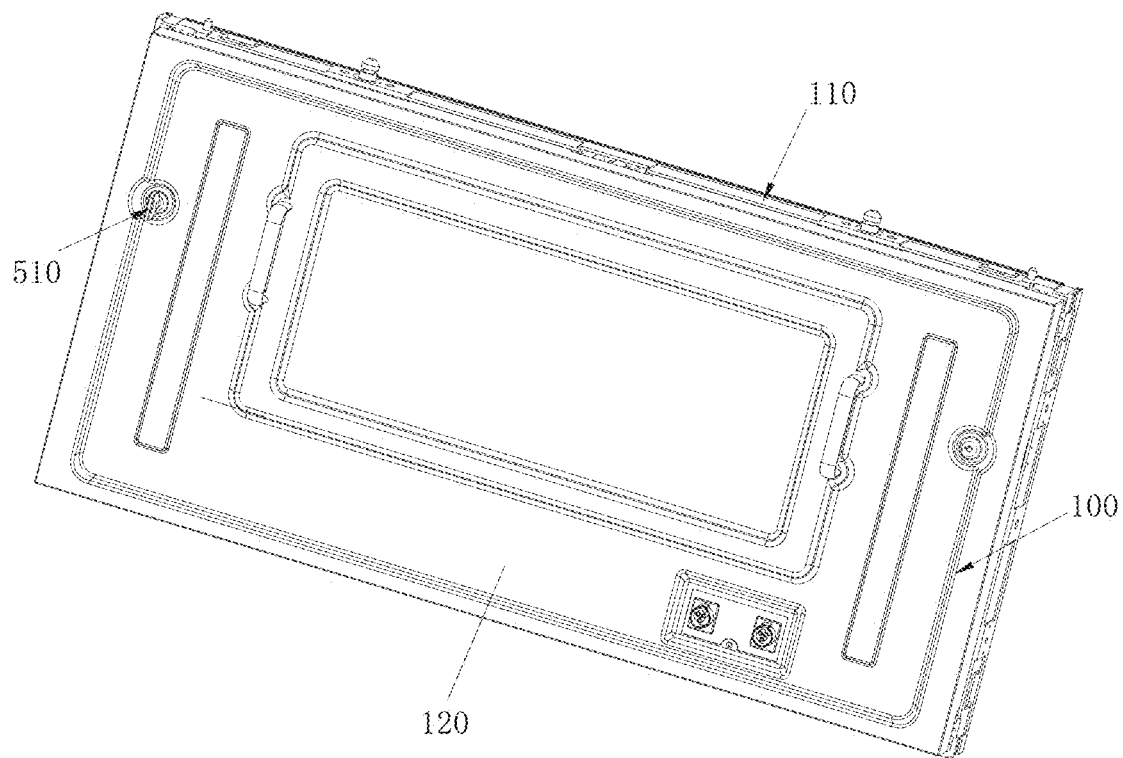
FIG. 18 is a schematic view of an LED box and a lock structure provided by an embodiment of the present invention.
Figure 19:
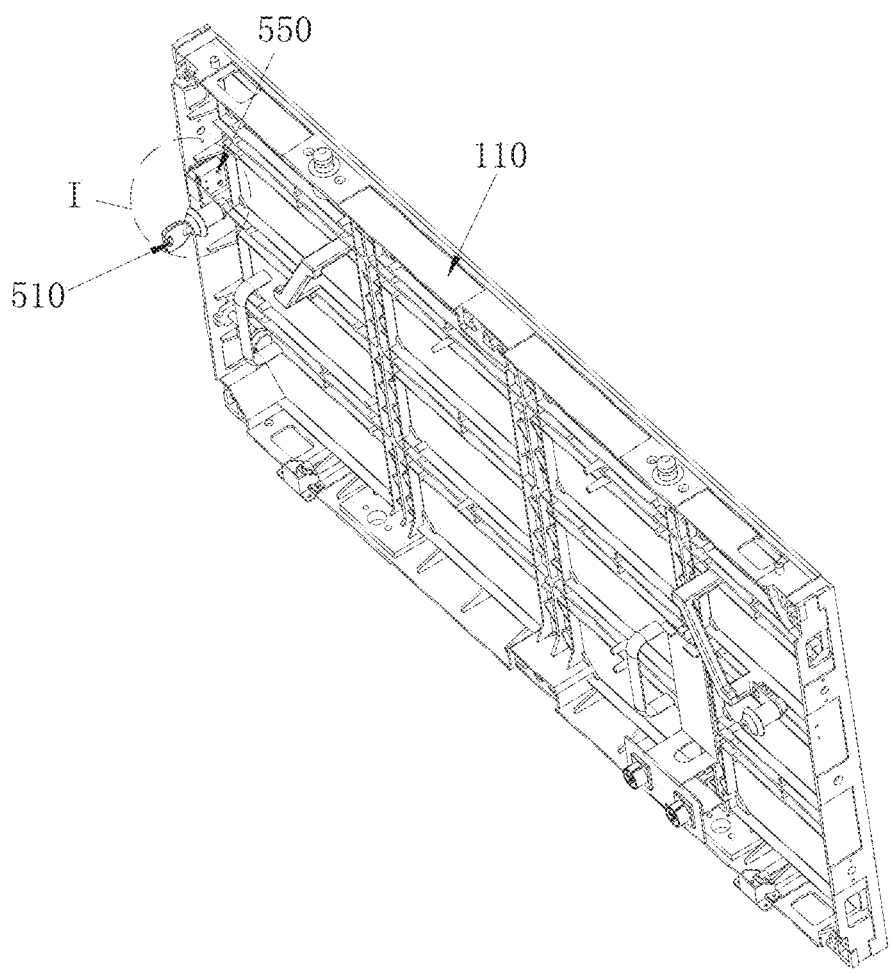
FIG. 19 is a schematic view of a frame and a lock structure provided by an embodiment of the present invention.
Figure 20:
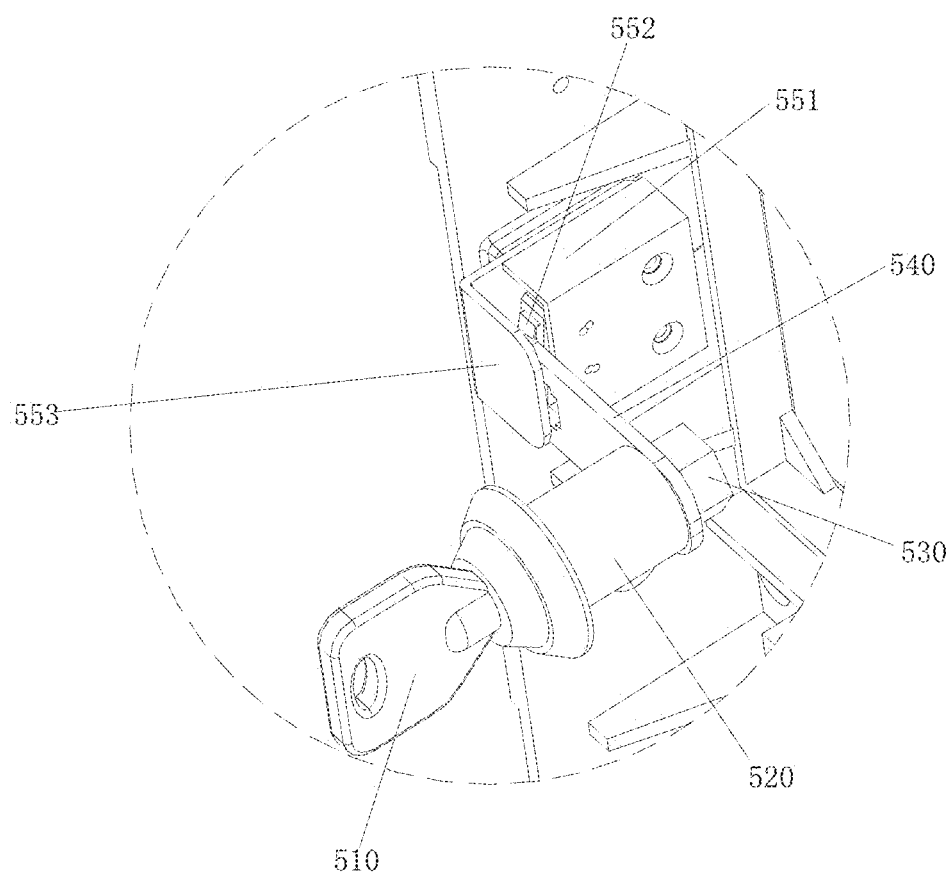
FIG. 20 is a schematic, enlarged view of a portion I of FIG. 19.

As shown in FIGS. 18 to 20, the spliced LED box body further includes a lock structure installed on the LED box 100. The lock structure includes a key 510, a shell 520, a lock cylinder 530, a lock tongue 540, and a microswitch unit 550. The shell 520 is fixed to a side of the door plate 120 toward the frame 110. The lock cylinder 530 is installed inside the shell 520. The key 510 can be inserted into the lock cylinder 530 and drive the lock cylinder 530 to rotate. The lock tongue 540 is connected to a distal end of the lock cylinder 530. The lock tongue 540 can rotate alongwith the lock cylinder 530.

The microswitch unit 550 includes a microswitch board 551, a microswitch 552 and a lock retainer 553. The microswitch board 551 is fixed on the frame 110, the microswitch 552 is arranged on a board surface of the microswitch board 551, the microswitch 552 is electrically connected to the LED module, and the lock retainer 553 is fixed on the microswitch board 551 and spaced from the microswitch 552. When the key 510 is turned 90° clockwise, the lock tongue 540 rotates to a position between the lock retainer 553 and the microswitch 552. The door plate 120 is locked because the lock retainer 553 blocks the lock tongue 540. At the same time, the lock tongue 540 triggers the microswitch 552, and the LED module starts to work normally. When the key 510 is turned clockwise less than 90°, the lock tongue 540, the microswitch 552 and the lock retainer 553 are staggered from each other. The door plate 120 is in an open state, the microswitch 552 is disconnected at this time, and the LED module stops working, thereby protecting the information transmission of the LED module. In this embodiment, the shell 520, the lock cylinder 530, the lock tongue 540 and the microswitch unit 550 each are two groups and are symmetrically arranged at two sides of the LED box 100.

In this embodiment, when the key 510 is turned 0° clockwise, the lock tongue 540 extends upwardly along the vertical direction; when the key 510 is turned 90° clockwise, the lock tongue 540 extends horizontally towards the left. In other possible embodiments, the microswitch unit 550 may be arranged at the top of the lock cylinder 530. When the key 510 is turned clockwise 0°, the lock tongue 540 extends horizontally towards the right; when the key 510 is turned 90° clockwise, the lock tongue 540 extends upwardly along the vertical direction and is located between the lock retainer 553 and the microswitch 552.

In addition, when the key 510 is turned clockwise 0° or 90°, the key 510 can be pulled out of the lock cylinder 530; when the key 510 is turned clockwise with an angle not equal to 0° or 90°, it is snapped with a key channel in the lock cylinder 530 and cannot be pulled out. Compared with the traditional lock structure of the LED box body, which has a key 510 that can be pulled out at any angle between 0° and 90° and thus causes the illusion that the door plate 120 is closed in place even though the door plate 120 is not completely closed, for the lock structure of the LED box body of an embodiment of the present invention, the key 510 only can be pulled out when it is turned clockwise with an angle of 0° or 90° during rotation thereof, so as to ensure that the door plate 120 can be closed in place and reduce the safety hazard.

The above merely describes preferred embodiments of the present invention without intention to limit the present disclosure, and thus any modifications, equivalent changes and improvements within the spirit and principles of the present invention should fall within the scope of the present invention.

What is claimed is:

1. A spliced LED box body, comprising:
   at least four LED boxes (100) arranged in rows and columns and spliced with each other, wherein connecting components are provided on opposite adjacent splicing surfaces of the LED box (100);
   the connecting components comprise a first connecting component, a second connecting component, a third connecting component and a fourth connecting component, the first connecting component and third connecting component are arranged on two adjacent side surfaces of the LED box (100), the second connecting component is arranged on a side surface of the LED box (100) opposite to the first connecting component, and the fourth connecting component is disposed on a side surface of the LED box (100) opposite to the third connecting component;
   when two adjacent LED boxes (100) are spliced, the first connecting component and second connecting component are matched and connected, and the third connecting component and fourth connecting component are matched and connected;
   wherein
   the splicing LED box body further comprises a hoisting structure, the hoisting structure comprises a hanger (200), the hanger (200) is mounted on the top of the LED boxes (100) arranged above,
   the hoisting structure further comprises a plurality of first connecting members (320) and a plurality of second connecting members (330) arranged between the hanger (200) and the LED box (100), two ends of the first connecting member (320) and second connecting member (330) are fixedly connected to the hanger (200) and the LED box (100), respectively, and the first connecting members (320) and the second connecting members (330) are evenly distributed on a connecting surface of the hanger (200) and the LED box (100).

2. The spliced LED box body according to claim 1, wherein
the first connecting component comprises a position limiting sliding groove (111) and a position fixing hole (112), and the second connecting component comprises a position limiting sliding block (121) matching with the position limiting sliding groove (111) and a positioning fixing pin (122) matching with the position fixing hole (112),
when two adjacent LED boxes (100) are spliced, the position limiting sliding block (121) is capable of sliding along the position limiting sliding groove (111) to achieve the position limiting of the two adjacent LED boxes (100), and the positioning fixing pin (122) is inserted into the position fixing hole (112) to achieve the position fixing of the two adjacent LED boxes (100) after the position limiting is completed;
the third connecting component comprises a positioning pole (131) and a limiting groove (132), and the fourth connecting component comprises a positioning aperture (141) matching with the positioning pole (131) and a limiting block (142) matching with the limiting groove (132),
when two adjacent LED boxes (100) are spliced, the positioning pole (131) is inserted into the positioning aperture (141) and the limiting block (142) is inserted into the limiting groove (132).

3. The spliced LED box body according to claim 2, wherein
the LED box (100) comprises opposite first side surface (10) and second side surface, and third side surface (30) and fourth side surface interconnecting the first side surface (10) and second side surface, the first side surface (10) and the second side surface extend along the vertical direction, and the third side surface (30) and the fourth side surface extend along the horizontal direction,
the first connecting component is arranged on the first side surface (10), the second connecting component is arranged on the second side surface, the third connecting component is arranged on the third side surface (30), and the fourth connecting component is arranged on the fourth side surface.

4. The spliced LED box body according to claim 1, wherein
the LED box (100) comprises a frame (110) and a door plate (120) which is fixed to and covers a side of the frame (110), the hanger (200) is formed by connecting a plurality of hanger bodies (210) together, the first connecting member (320) comprises a connecting piece (321) and a screw (322),
the hanger body (210) comprises a bottom plate (211) fixed to the top of the frame (110) and side plates (212) extending upwardly from two long axis sides of the bottom plate (211), one end of the connecting piece (321) is clamped between the frame (110) and the door plate (120), and the other end of the connecting piece (321) is fixed to the side plate (212) through the screw (322).

5. The spliced LED box body according to claim 4, wherein the second connecting member (330) is a quick installation lock, the frame (110) comprises a top border (111) fixed to the bottom plate (211), the quick installation lock passes through the top border (111) and the bottom plate (211) in sequence to lock the top border (111) and the bottom plate (211).

6. The spliced LED box body according to claim 4, wherein
the hoisting structure further comprises a plurality of third connecting members (340) and a plurality of connecting screw rods (350), the hanger (200) is formed by connecting the hanger bodies (210) through the third connecting members (340) and the connecting screw rods (350),
the hanger body (210) further comprises a top plate (213) which is arranged on the top of the two side plates (212) and interconnects the two side plates (212), two side plates (212) of one hanger body (210) and the side plates (212) of an adjacent hanger body (210) at the same side abut each other one by one,
the third connecting member (340) is arranged at a joint of two hanger bodies (210), and comprises two opposite vertical connecting arms (341) and a transverse connecting arm (342) interconnecting the two vertical connecting arms (341), the two vertical connecting arms (341) are arranged corresponding to the side plates (212) at different sides, respectively, and each vertical connecting arm (341) is attached to the two side plates (212) which are located at the same side and abut each other,
the connecting screw rods (350) pass through the two opposite vertical connecting arms (341) and the two opposite side plates (212) to realize the connection of the first connecting piece (320) and the hanger (200).

7. The spliced LED box body according to claim 6, wherein
the hoisting structure further comprises a bracket (370) arranged on the hanger body (210) and at least two sets of adjustment components for fixing the hanger body (210) and the bracket (370), the adjustment component comprises a screw rod (360) extending vertically through the top of the hanger body (210),
the hoisting structure further comprises a first nut (390) screwed on the screw rod (360), the bracket (370) is mounted around on the screw rod (360) and placed on the hanger body (210), the first nut (390) is fixedly connected to the hanger body (210), and the height position of the hanger body (210) relative to the screw rod (360) is capable of being adjusted by screwing the screw rod (360) to adjust the top surfaces of the hanger bodies (210) to be flush.

8. The spliced LED box body according to claim 4, wherein
the LED box (100) further comprises an LED module, the LED module and the door plate (120) are arranged at opposite sides of the frame (110),
the splicing LED box body further comprises an LED module protection structure for protecting the LED box (100), the LED module protection structure comprises a plurality of first corner protection structures (410) arranged at corners of the LED box (100) and covering the corners,
the first corner protection structure (410) comprises a first fixed plate (411) clamped between the frame (110) and the door plate (120), two first side plates (412) extending from two neighboring sides of the first fixed plate (411) along a direction away from the door plate (120), and a first protective plate (413) interconnecting ends of the two first side plates (412) away from the door plate (120), and the first side plate (412) extends beyond a plane wherein a surface of the LED module is located.

9. The spliced LED box body according to claim 8, wherein the splicing LED box body further comprises a lock structure installed on the LED box (100), the lock structure comprises a key (510), a shell (520), a lock cylinder (530), a lock tongue (540) and a microswitch unit (550), the shell (520) is fixed to a side of the door plate (120) facing the frame (110), the lock cylinder (530) is installed inside the shell (520), the key (510) is able to be inserted into the lock cylinder (530) to drive the lock cylinder (530) to rotate, the lock tongue (540) is connected to a distal end of the lock cylinder (530), the microswitch unit (550) comprises a microswitch board (551), a microswitch (552) and a lock retainer (553), the microswitch board (551) is fixed to the frame (110), the microswitch (552) is arranged on a board surface of the microswitch board (551), the microswitch (552) is electrically connected to the LED module, the lock retainer (553) is fixed onto the microswitch board (551) and is spaced from the microswitch (552), when the key (510) is turned 90° clockwise, the lock tougue (540) is rotated to a position between the lock retainer (553) and the microswitch (552) and triggers the microswitch (552), and the LED module starts to work.

\* \* \* \* \*